US010887402B2

(12) United States Patent
Ho

(10) Patent No.: US 10,887,402 B2
(45) Date of Patent: Jan. 5, 2021

(54) COMMUNICATION METHOD FOR KEEPING NETWORK CONNECTION OF AN ELECTRONIC DEVICE IN A SLEEP MODE, ADDRESS TRANSLATOR, AND SERVER USING THE SAME

(71) Applicants: ThroughTek Technology (ShenZhen) Co., Ltd., Shenzhen (CN); ThroughTek Co., Ltd., Taipei (TW)

(72) Inventor: Wen-Kai Ho, Taipei (TW)

(73) Assignees: THROUGHTEK TECHNOLOGY (SHENZHEN) CO., LTD., Shenzhen (CN); THROUGHTEK CO., LTD., Taipei (TW)

( * ) Notice: Subject to any disclaimer, the term of this patent is extended or adjusted under 35 U.S.C. 154(b) by 679 days.

(21) Appl. No.: 15/087,061

(22) Filed: Mar. 31, 2016

(65) Prior Publication Data

US 2017/0033985 A1 Feb. 2, 2017

(30) Foreign Application Priority Data

Jul. 31, 2015 (TW) .............................. 104125030 A

(51) Int. Cl.
*H04L 29/08* (2006.01)
*H04L 12/46* (2006.01)
*H04L 12/28* (2006.01)
*H04L 12/24* (2006.01)

(52) U.S. Cl.
CPC ............ *H04L 67/142* (2013.01); *H04L 12/28* (2013.01); *H04L 12/4625* (2013.01); *H04L 41/0833* (2013.01)

(58) Field of Classification Search
CPC .......................... H04L 67/145; H04L 67/142
USPC ......................................................... 709/226
See application file for complete search history.

(56) References Cited

U.S. PATENT DOCUMENTS

| | | | |
|---|---|---|---|
| 2007/0140159 A1* | 6/2007 | Eronen | H04L 12/12 370/328 |
| 2010/0325306 A1* | 12/2010 | Vimpari | H04L 29/12471 709/233 |
| 2012/0117401 A1* | 5/2012 | Gobriel | G06F 1/3209 713/320 |
| 2012/0131663 A1* | 5/2012 | Anchan | H04L 29/12471 726/13 |

* cited by examiner

*Primary Examiner* — Normin Abedin
*Assistant Examiner* — Hien V Doan
(74) *Attorney, Agent, or Firm* — Muncy, Geissler, Olds & Lowe, P.C.

(57) ABSTRACT

A communication method for keeping network connection of an electronic device in a sleep mode includes connecting an address translator to an electronic device via a local network, connecting the address translator to a server via an internet network, providing a connection channel between the electronic device and the server by using the address translator, sending a first keeping-connection request from the electronic device to the address translator before the electronic device gets into a sleep mode, and keeping freely flowing of the connection channel according to the first keeping-connection request by using the address translator when the electronic device is in the sleep mode.

22 Claims, 9 Drawing Sheets

COMMUNICATION METHOD FOR KEEPING NETWORK CONNECTION OF AN ELECTRONIC DEVICE IN A SLEEP MODE, ADDRESS TRANSLATOR, AND SERVER USING THE SAME

CROSS-REFERENCES TO RELATED APPLICATIONS

This non-provisional application claims priority under 35 U.S.C. § 119(a) on Patent Application No. 104125030 filed in Taiwan, R.O.C. on 2015 Jul. 31, the entire contents of which are hereby incorporated by reference.

BACKGROUND

Technical Field

The instant disclosure relates to the network communication system, in particular, to a communication method for keeping network connection of an electronic device in a sleep mode, an address translator, and a server using the same.

Related Art

As the development of technology and science, techniques of internet of things (IOT) and cloud computing have widely applied to various fields, such as smart home facility, mobile terminal equipment and industrial system environment. In the internetization era, people can communicate with each other via internet, and access information of object (i.e. other electronic device) via internet. IOT further creates a network environment for mutual communication between objects. For example of IP (Internet Protocol) camera, user can use IP camera to have a remote monitoring and/or controlling action, such as an immediate video conference, watch children in any time, or monitor home for safety.

In network communication system, for maintaining freely flowing in whole connection architecture and mechanism, energy consumption usually occurs, such that it does not conform to the requirement of modern environment protection and green energy. Therefore, it is necessary to correct and improve the energy consumption of network communication system.

SUMMARY

In an embodiment of the present disclosure, the communication method for keeping network connection of an electronic device in a sleep mode includes connecting an address translator to an electronic device via a local network, connecting the address translator to a server via an internet network, providing a connection channel between the electronic device and the server by using the address translator, sending a first keeping-connection request from the electronic device to the address translator before the electronic device gets into a sleep mode, and keeping freely flowing of the connection channel according to the first keeping-connection request by using the address translator when the electronic device is in the sleep mode.

In an embodiment of the present disclosure, an address translator includes a plurality of internal-oriented connection ports, an externally-oriented connection port, and a controlling module. A first connection port of the internal-oriented connection ports is connected to an electronic device via a local network. The externally-oriented connection port is connected to a server via an internet network. The controlling module is connected to the internal-oriented connection ports and the externally-oriented connection port and provides/arranges a connection channel between the first connection port and the externally-oriented connection port. The controlling module receives a first keeping-connection request from the electronic device and keeps freely flowing of the connection channel between the first connection port and the externally-oriented connection port according to the first keeping-connection request.

In an embodiment of the present disclosure, a server includes a network connection port, a storing unit, and a controlling module. The network connection port receives a keeping-connection request from an address translator via an internet network. The storing unit stores a connection information of the address translator. The controlling module is connected to the network connection port and the storing unit. The controlling module reserves the connection information stored in the storing unit according to the keeping-connection request to not eliminate the connection information stored in the storing unit.

In summary, according to the embodiments of the communication method for keeping network connection of an electronic device in a sleep mode, an address translator, and a server using the same can make the electronic device getting into low power consumption state (i.e. the sleep mode) and keep freely flowing of the network connection for the network connection port (i.e. the first connection port) of the address translator corresponding to the electronic device. In some embodiments, the address translator can slightly modify codes implementing any embodiment of the present disclosure without implanting the third-party library, and therefore the development cost of the communication system is decreased. Meanwhile, the electronic device can slightly increase the codes conforming to a simple protocol. Accordingly, in comparison with the technique with implanting the third-party library, according to some embodiments of the communication method for keeping network connection of an electronic device in a sleep mode, the address translator, and the server using the same communication method can significantly reduce the use of memory.

The following detailed description illustrates the features and advantages of the present disclosure, the content of detailed description is sufficient to enable the person skilled in the art to understand the contents of the present disclosure and to practice said disclosure. According to the contents, the claims and the drawings of the present disclosure, the person skilled in the art can easily understand the purposes and advantages of the present disclosure.

DETAILED DESCRIPTION

Figure 1:
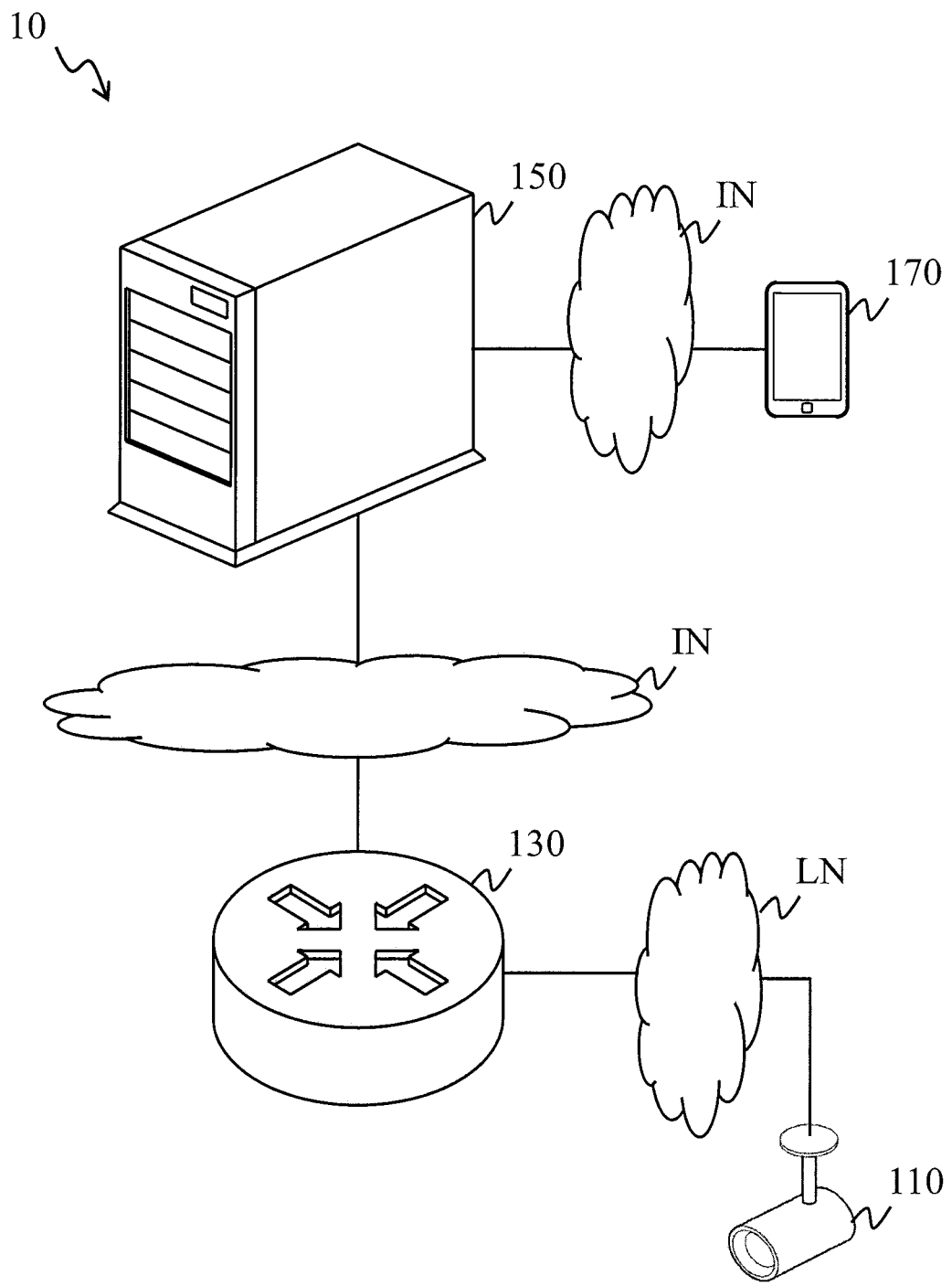
FIG. 1 is a schematic diagram illustrating an embodiment of a network communication system according to the instant disclosure.
Figure 2:
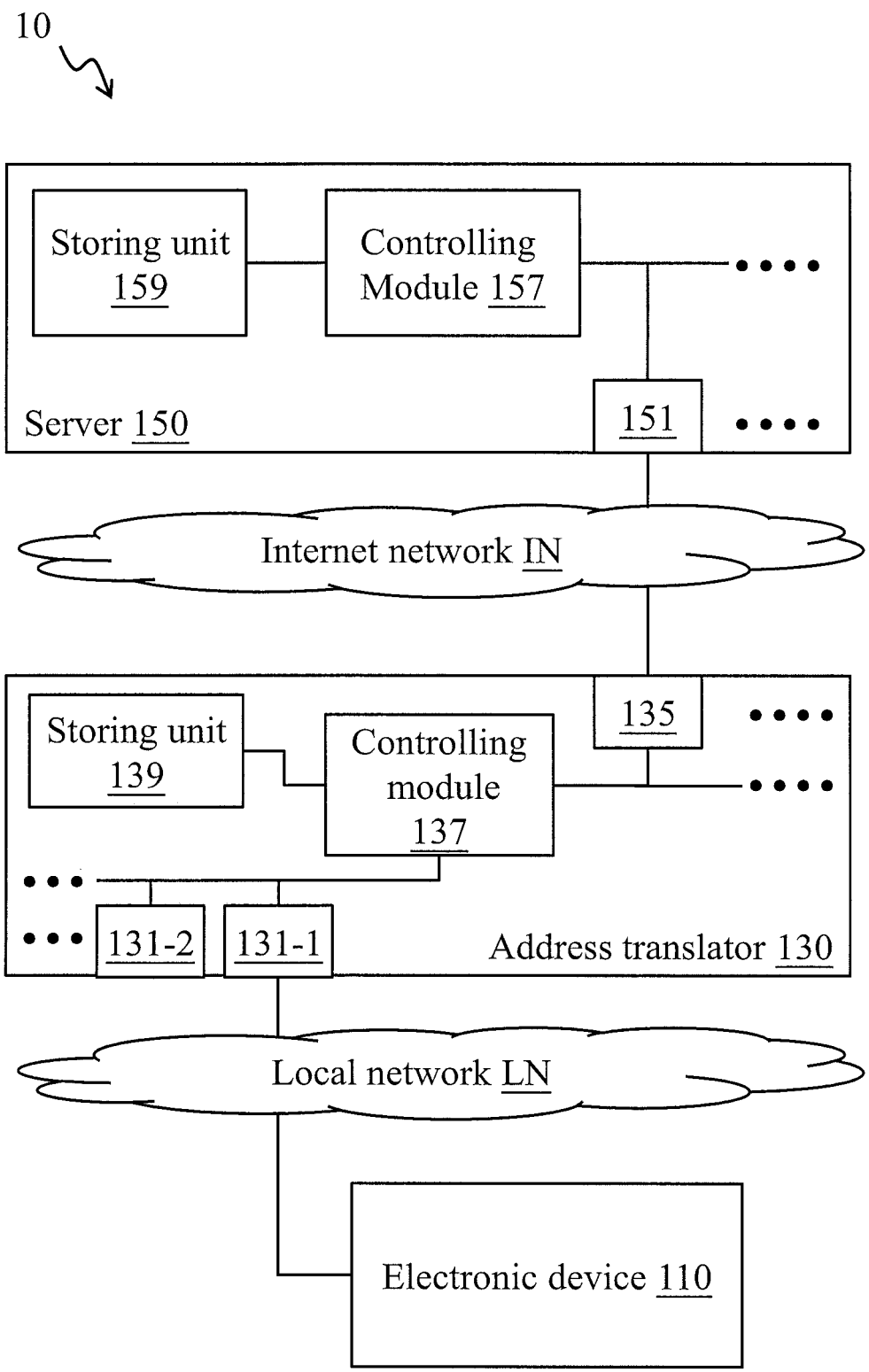
FIG. 2 is a functional block diagram illustrating the embodiment of the network communication system according to the instant disclosure.
Figure 3:
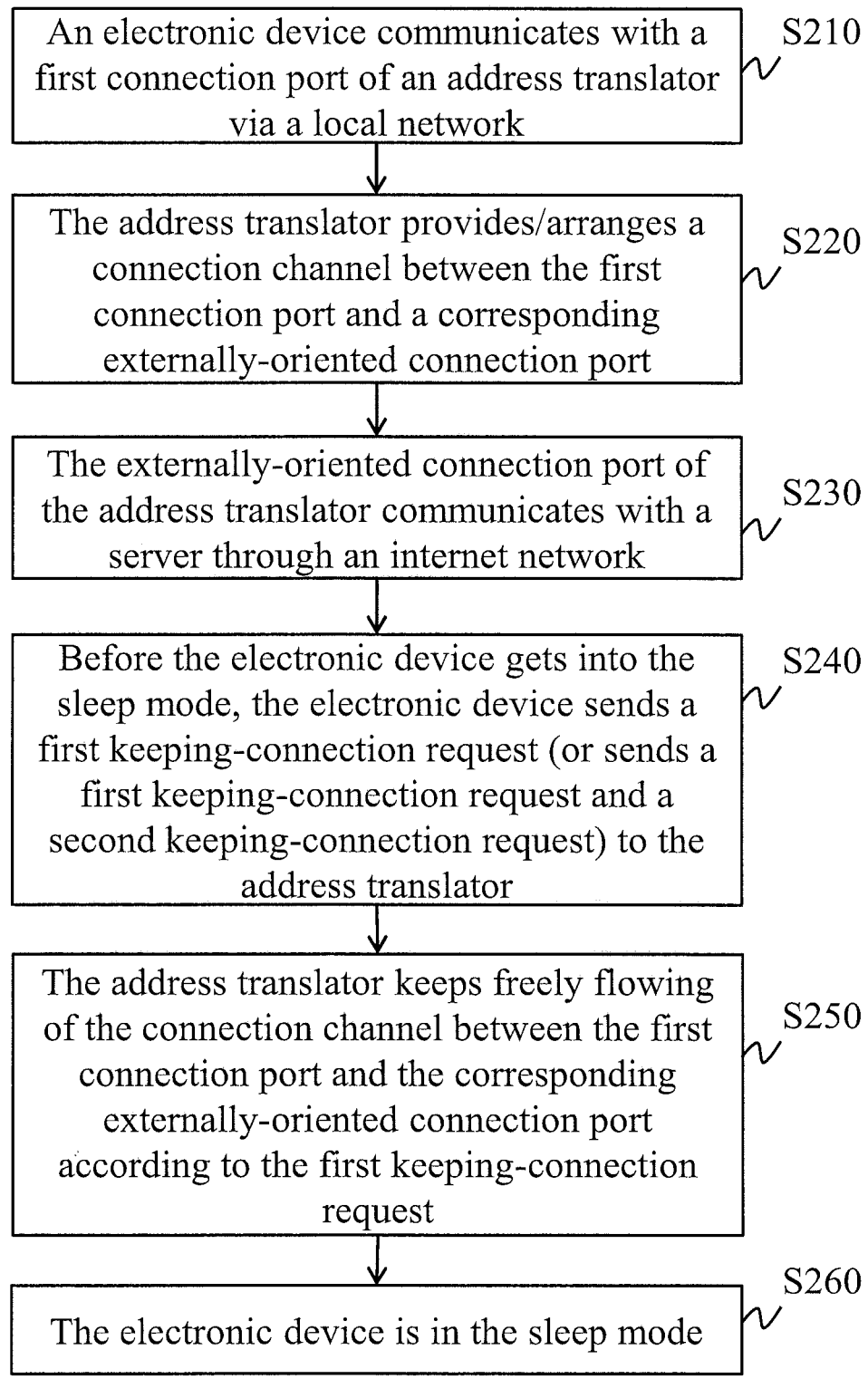
FIG. 3 is a flow chart illustrating a first embodiment of a communication method according to the instant disclosure.

FIG. 1 is a schematic diagram illustrating an embodiment of a network system according to the instant disclosure. FIG. 2 is a functional block diagram illustrating the embodiment of the network communication system according to the instant disclosure. FIG. 3 is a flow chart illustrating a first embodiment of a communication method according to the instant disclosure.

Referring to FIG. 1 to FIG. 3, a network communication system 10 has a capability of keeping a network connection of an electronic device in a sleep mode. The network communication system 10 includes an electronic device 110, an address translator 130 and a server 150. The address translator 130 is used for providing a communication channel between an internet network IN and a local network LN. The server 150 communicates with the address translator 130 via the internet network IN. The electronic device 110 communicates with the address translator 130 via the local network LN. However, the communicating way is not limited to wireless network.

The address translator 130 includes a plurality of internal-oriented connection ports, one or more externally-oriented connection ports 135, and a controlling module 137. The internal-oriented connection ports are generic term of the first connection port 131-1 and the second connection port 131-2. The controlling module 137 is connected to the internal-oriented connection ports and the externally-oriented connection port 135. The internal-oriented connection ports are ports for being connected to internal devices, and the externally-oriented connection ports 135 are ports for being connected to external devices. One of the internal-oriented connection ports (hereafter referred to as a first connection port 131-1) is connected to and communicates with the electronic device 110 via the local network LN. The externally-oriented connection port 135 is connected to and communicates with the server 150 via the internet network IN. The electronic device 110 executes an installation setting, to be connected to and communicate with the first connection port 131-1 of the address translator 130 via the local network LN (step S210). Then, the electronic device 110 executes a connection setting with the server 150 via the address translator 130; that is, the electronic device 110 sends the authentication data to the server 150 to login. In this case, the controlling module 137 of the address translator 130 provides/arranges a connection channel between the first connection port 131-1 and the corresponding externally-oriented connection port 135 (step S220), and the externally-oriented connection port 135 of the address translator 130 is connected to and communicates with the server 150 via the internet network IN (step S230). In other words, after the connection setting is finished, the electronic device 110 can be connected to the server 150 via the address translator 130.

The server 150 includes at least a network connection port 151, a controlling module 157, and a storing unit 159. The controlling module 157 is electrically connected to the network connection port 151 and the storing unit 159. The externally-oriented connection port 135 of the address translator 130 is connected to and communicates with the network connection port 151 via the internet network IN. During the connection setting, the controlling module 157 receives the authentication data from the electronic device 110 via the address translator 130 and verifies with the received authentication data. After the verification, the controlling module 157 agrees the connection of the address translator 130 to establish the connection setting between the server 150 and the address translator 130, and records (stores) a connection information (hereafter referred to as the first connection information) of the address translator 130 sending the authentication data (i.e. the first connection information of the first connection port 131-1) in the storing unit 159 of the server 150 for a preset time. After the first connection information is recorded/stored in the storing unit 159, the controlling module 157 detects an elapsed time when the network connection port 151 does not receive a network packet from the address translator 130. When the elapsed time reaches the preset time (namely, the stored time of the first connection information reaches the preset time), the controlling module 157 determines that the electronic device 110 is off-line and eliminates the first connection information which corresponds to the electronic device 110 and is stored in the storing unit 159.

In the normal operation mode, after the connection setting of the electronic device 110 is finished, the electronic device 110 periodically sends the network packet (hereafter referred to as a first network packet) to the server 150 via the address translator 130, and a sending time interval is less than or equal to the preset time, so that the controlling module 157 updates the connection information in the storing unit 159 (namely, the first connection information stored in the storing unit 159) according to the first network packet. In other words, the first network packet at least includes a current connection information of the first connection port 131-1 (hereafter referred to as a second connection information). In some embodiments, after the controlling module 157 of the server 150 receives the first network packet via the network connection port 151, the controlling module 157 overwrites (updates) the first connection information in the storing unit 159 with the second connection information of the first network packet, and restarts to time the elapsed time (namely, the stored time of the connection information). In some other embodiments, after the controlling module 157 of the server 150 receives the second connection information, the controlling module 157 determines whether there is difference between the received second connection information and the first connection information of the storing unit 159 or not. When the second connection information is different from the first connection information, the controlling module 157 overwrites (updates) the first connection information of the storing unit 159 with the second connection information. Otherwise, when the second connection information is not different from the first connection information, the controlling module 157 does not overwrite (update) the first connection information, and the controlling module 157 only restarts to time the elapsed time.

Herein, the electronic device 110 is a low-power device. In other words, the electronic device 110 further has a power-saving mode besides the normal operation mode. In the power-saving mode, the electronic device 110 gets into the sleep mode (without any network activity) to save power.

Before the electronic device 110 gets into the sleep mode, the electronic device 110 sends a first keeping-connection request (or sends a first keeping-connection request and a second keeping-connection request) to the address translator 130 via the local network LN (step S240). The controlling module 137 of the address translator 130 receives the first keeping-connection request via the first connection port 131-1, and keeps freely flowing of the connection channel between the first connection port 131-1 and the corresponding externally-oriented connection port 135 according to the first keeping-connection request (step S250). The electronic device 110 can immediately get into the sleep mode after sending the first keeping-connection request (step S260).

In some embodiments, the first keeping-connection request adopted by the address translator 130 may include a first time representing a reserving time of the first connection port 131-1 which the electronic device 110 is connected to the extranet via; in other words, the first connection port 131-1 keeps alive. Herein, the first time can be defined by the electronic device 110 according to a preset time parameter and/or historical sleep time and/or other information. In some embodiments, the first keeping-connection request can use a simple self-defined protocol between the electronic device 110 and the address translator 130 so that the electronic device 110 does not implement too many codes. In some other embodiments, the electronic device 110 can be embedded a standard protocol, such as universal plug and play, to implement the first keeping-connection request.

In the step S240, the electronic device 110 sends a request for keeping the first connection port 131-1 alive (namely, a first keeping-connection request) to the address translator 130.

In some embodiments, the electronic device 110 also may send a request for locking the first connection information of the first connection port 131-1 (namely, a second keeping-connection request) to the server 150. In other words, the request is used to request that the server 150 to not eliminate the first connection information and request that the server 150 to continuously reserve the first connection information in the storing unit 159 when the electronic device 110 is in the sleep mode. Herein, the second keeping-connection request sent by the electronic device 110 is relayed to the server 150 by the address translator 130.

Figure 4:
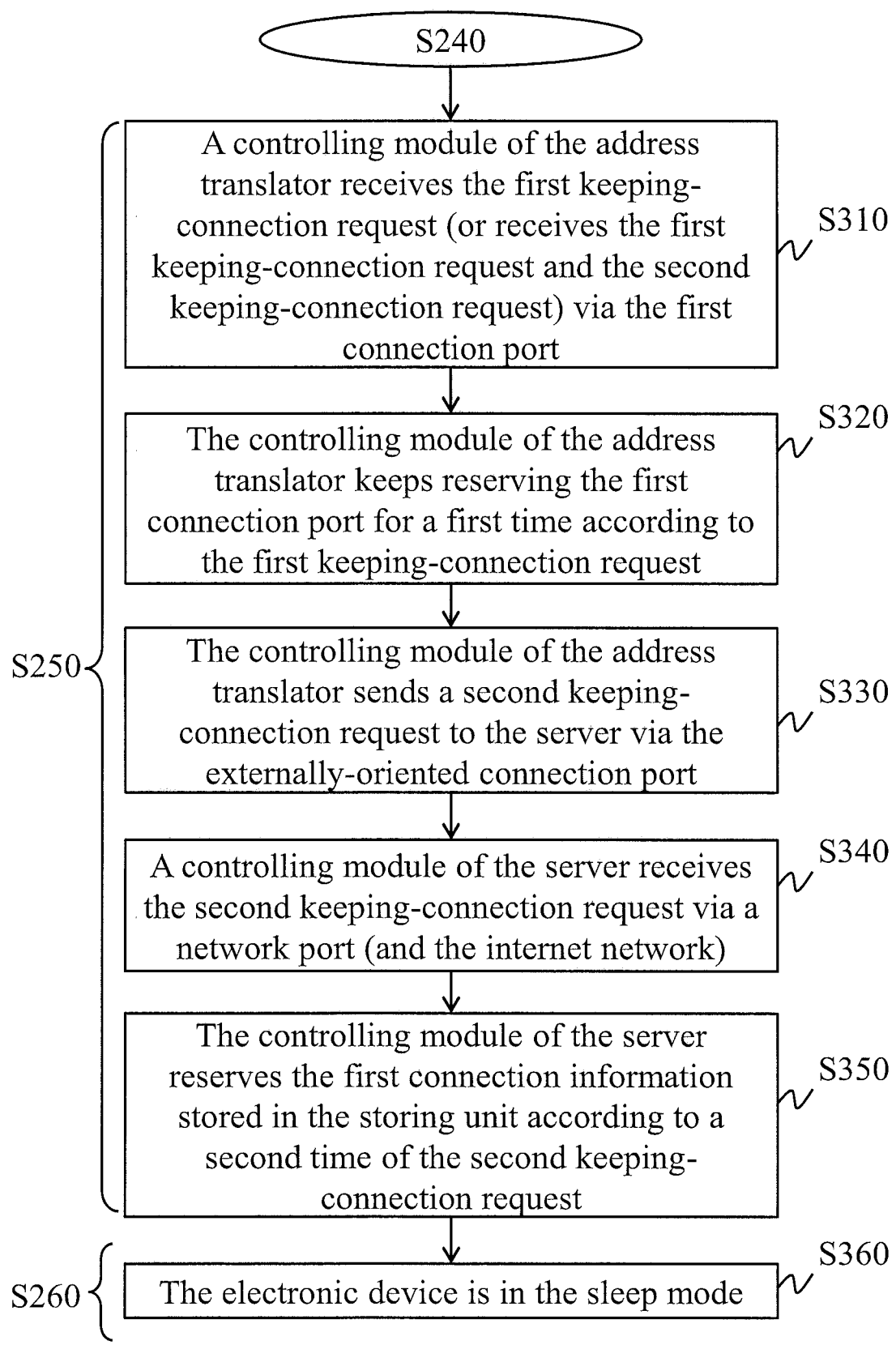
FIG. 4 is a flow chart illustrating an embodiment of step S250.

Referring to the FIG. 4, after the controlling module 137 receives the first keeping-connection request (or receives the first keeping-connection request and the second keeping-connection request) via the first connection port 131-1 (and the local network LN) (step S310), the controlling module 137 keeps the first connection port 131-1 to continuously be valid/alive for the first time according to the first keeping-connection request (step S320), such that the devices located in the internet network IN, such as the server 150, the remote device 170 or other devices, directly sends the network packet to the electronic device 110 located in the local network LN via the externally-oriented connection port 135 of the address translator 130.

In some other embodiments, the electronic device 110 can simultaneously sends the first keeping-connection request for the address translator 130 and the second keeping-connection request for the server 150 to the address translator 130, but not limited thereto. In other words, the first keeping-connection request and the second keeping-connection request can be sent sequentially. The sending sequence of the first keeping-connection request and the second keeping-connection request does not have any substantive effect.

In other embodiments, the second keeping-connection request can also be generated by the address translator 130. In other words, after the controlling module 137 receives the first keeping-connection request, the controlling module 137 generates the second keeping-connection request according to the first keeping-connection request and sends the second keeping-connection request to the server 150, to request the server 150 to continuously reserve the first connection information of the first connection port 131-1 without eliminating it due to the electronic device 110 is in the sleep mode.

Herein, the second keeping-connection request received by the server 150 includes a second time representing a reserving time of the first connection information recorded/stored in the server 150. The second time can be defined by the electronic device 110 according to the preset time parameter and/or the historical sleep time and/or other information. The second keeping-connection request can be implemented by one or two network packets.

For example, after the controlling module 137 of the address translator 130 receives the first keeping-connection request (or receives the first and second keeping-connection requests) via the first connection port 131-1 (step S310), the controlling module 137 outputs the second keeping-connection request via the externally-oriented connection port 135 to the internet network IN, to send the second keeping-connection request to the server 150 (step S330).

The controlling module 157 of the server 150 receives the second keeping-connection request via the network connection port 151 (and the internet network IN) (step S340), and reserves the first connection information stored in the storing unit 159 according to the second time of the received second keeping-connection request (step S350). In other words, during the second time, the controlling module 157 of the server 150 reserves the first connection information of the storing unit 159 without eliminating it due to the electronic device 110 is in the sleep mode (so as to be off-line). Thus, even the electronic device 110 does not continuously send packets to update the record of the first connection information, the remote device 170 can find out the first connection information corresponding to the electronic device 110 from the server 150 anytime.

In some embodiments, after recording/storing the first connection information, the controlling module 157 of the server 150 detects the elapsed time when the network connection port 151 does not receive the network packet from the address translator 130. When the elapsed time reaches the preset time and the controlling module 157 does not receive the second keeping-connection request, the controlling module 157 determines that the electronic device 110 is off-line and eliminates the first connection information corresponding to the electronic device 110 and in the storing unit 159. When the elapsed time reaches the preset time and the controlling module 157 receives the second keeping-connection request, the controlling module 157 continuously times a elapsed time and confirms whether the elapsed time reaches the second time or not. When the elapsed time reaches the second time, the controlling module 157 determines that the electronic device 110 is off-line and eliminates the first connection information corresponding to the electronic device 110 and in the storing unit 159. Otherwise, when the elapsed time does not reach the second time, the controlling module 157 reserves the first connection information corresponding to the electronic device 110 and stored in the storing unit 159.

In some embodiments, after the electronic device 110 outputs the keeping-connection request (namely, outputs the first keeping-connection request or outputs the first and second keeping-connection requests) to the local network LN (step S240), the electronic device 110 immediately gets into the sleep mode (step S360).

Figure 5:
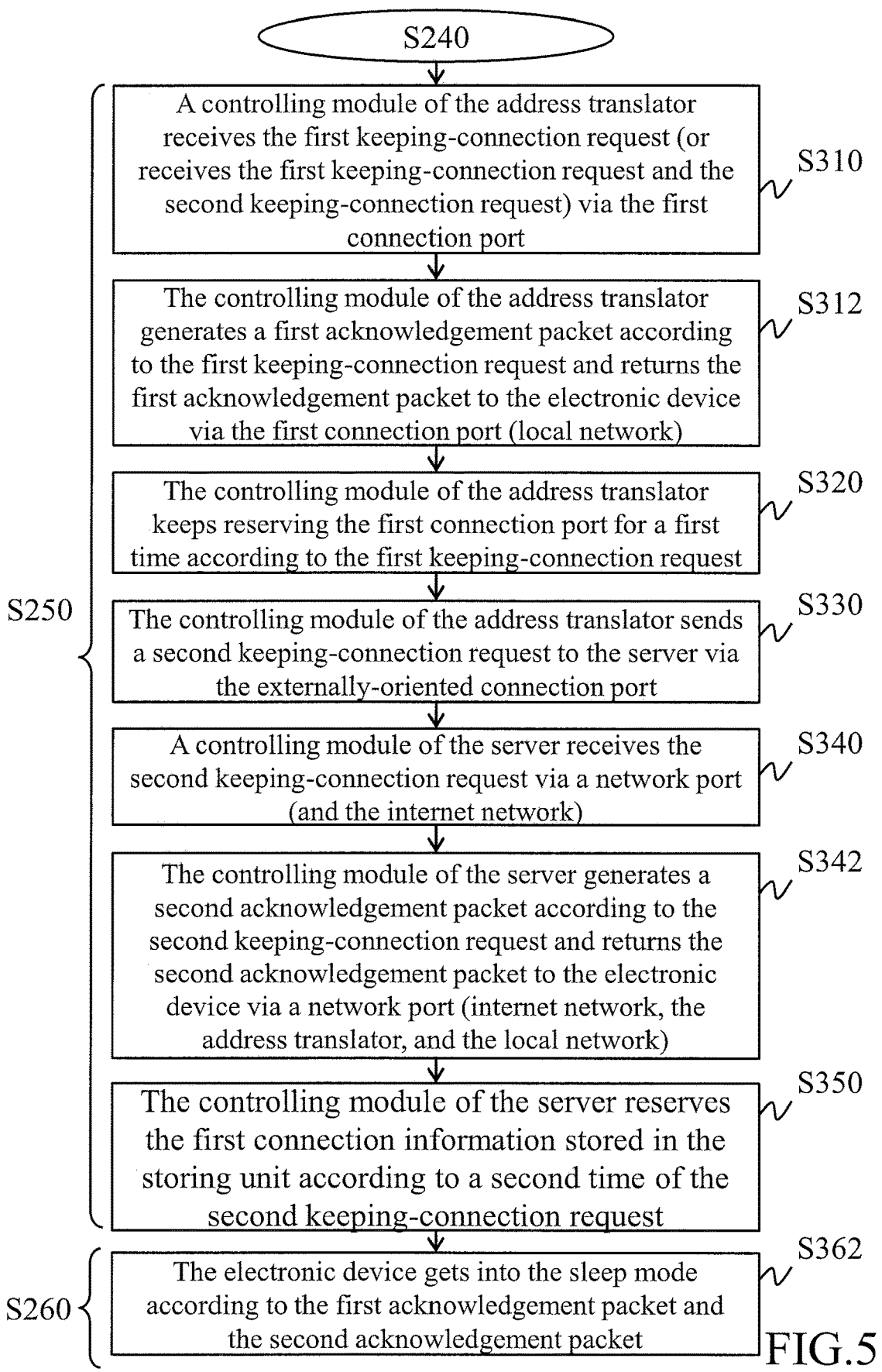
FIG. 5 is a flow chart illustrating another embodiment of step S250.

In some embodiments, please referring to FIG. 5, after the controlling module 137 of the address translator 130 receives the first keeping-connection request (or receives the first and second keeping-connection requests) via the first connection port 131-1 (step S310), the controlling module 137 generates a acknowledgement packet (hereafter referred to as a first acknowledgement packet) according to the received first keeping-connection request and returns the first acknowledgement packet to the electronic device 110 via the first connection port 131-1 (and the local network LN) (step S312).

After the controlling module 157 of the server 150 receives the second keeping-connection request via the network connection port 151 (and the internet network IN) (step S340), the controlling module 157 generates a acknowledgement packet (hereafter referred to as a second acknowledgement packet) according to the received second keeping-connection request and returns the second acknowledgement packet to the address translator 130 (and the internet network IN and the externally-oriented connection port 135). Then, the second acknowledgement packet is sent to the electronic device 110 by the address translator 130 (and the first connection port 131-1 and the local network LN) (step S342).

In this embodiment, after the electronic device 110 outputs the keeping-connection request (namely, outputs the first keeping-connection request or outputs the first and second keeping-connection requests) to the local network LN (step S240), the electronic device 110 detects the acknowledgement packets returned by the address translator 130 and the server 150. When the electronic device 110 receives the first acknowledgement packet and the second acknowledgement packet, the electronic device 110 gets into the sleep mode (step S362), but not limited thereto. In other embodiments, the electronic device 110 gets into the sleep mode when the electronic device 110 confirms that the first acknowledgement packet or the second acknowledgement packet is received.

In some embodiments, after the controlling module 137 of the address translator 130 receives the first keeping-connection request (or receives the first and second keeping-connection requests) via the first connection port 131-1 (and the local network LN) (step S310), the controlling module 137 compares the first time of the first keeping-connection request with an originally preset-reserving time (stored in the storing unit 139 of the address translator 130). When the first time is less than the originally preset-reserving time, the controlling module 137 responses a refusing message via the first connection port 131-1 and notifies the electronic device 110 of how much the originally preset-reserving time is. In other words, the refusing message includes a refusing notification and the originally preset-reserving time. The electronic device 110 can generate the first time again according to the originally preset-reserving time of the refusing message, for example, the first time which is larger than or equal to the originally preset-reserving time. And then, the electronic device 110 can send the first keeping-connection request having a first time which is generated again.

Figure 6:
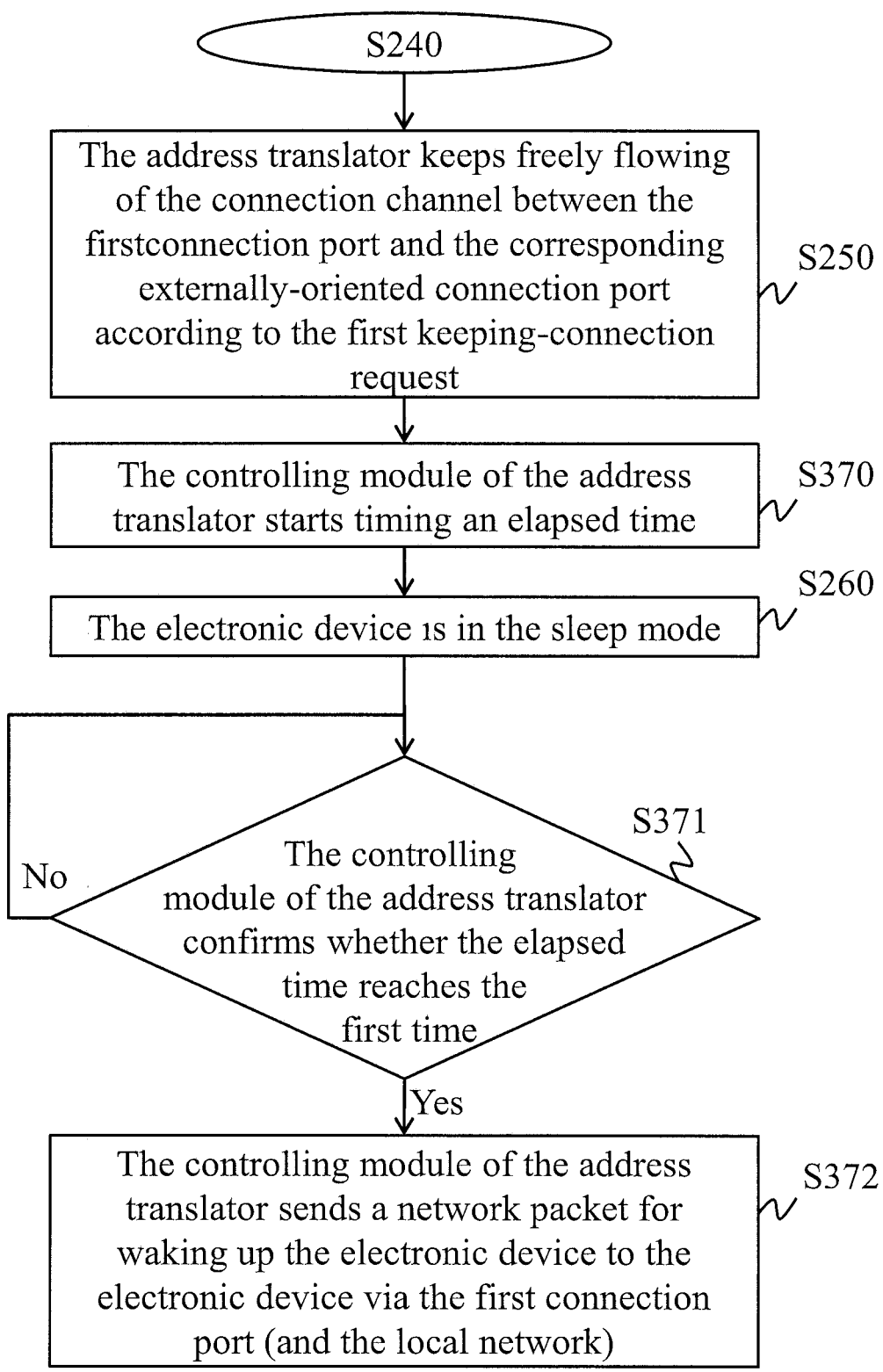
FIG. 6 is a partial flow chart illustrating a second embodiment of the communication method according to the instant disclosure.

In some embodiments, please referring to FIG. 6, after the controlling module 137 of the address translator 130 keeps the first connection port 131-1 to continuously be valid/alive (step S250), the controlling module 137 of the address translator 130 starts to time an elapsed time (step S370) and confirms whether the elapsed time reaches the first time as requested by the electronic device 110 (step S371). The timing step of the elapsed time can be implemented by software or hardware, such as a timer, they have been known to those of skill in the art, and it is not explained in detail here.

When the elapsed time reaches the first time requested by the electronic device 110, the controlling module 137 sends a network packet for waking up the electronic device 110 via the first connection port 131-1 (and the local network LN) (step S372).

Figure 7:
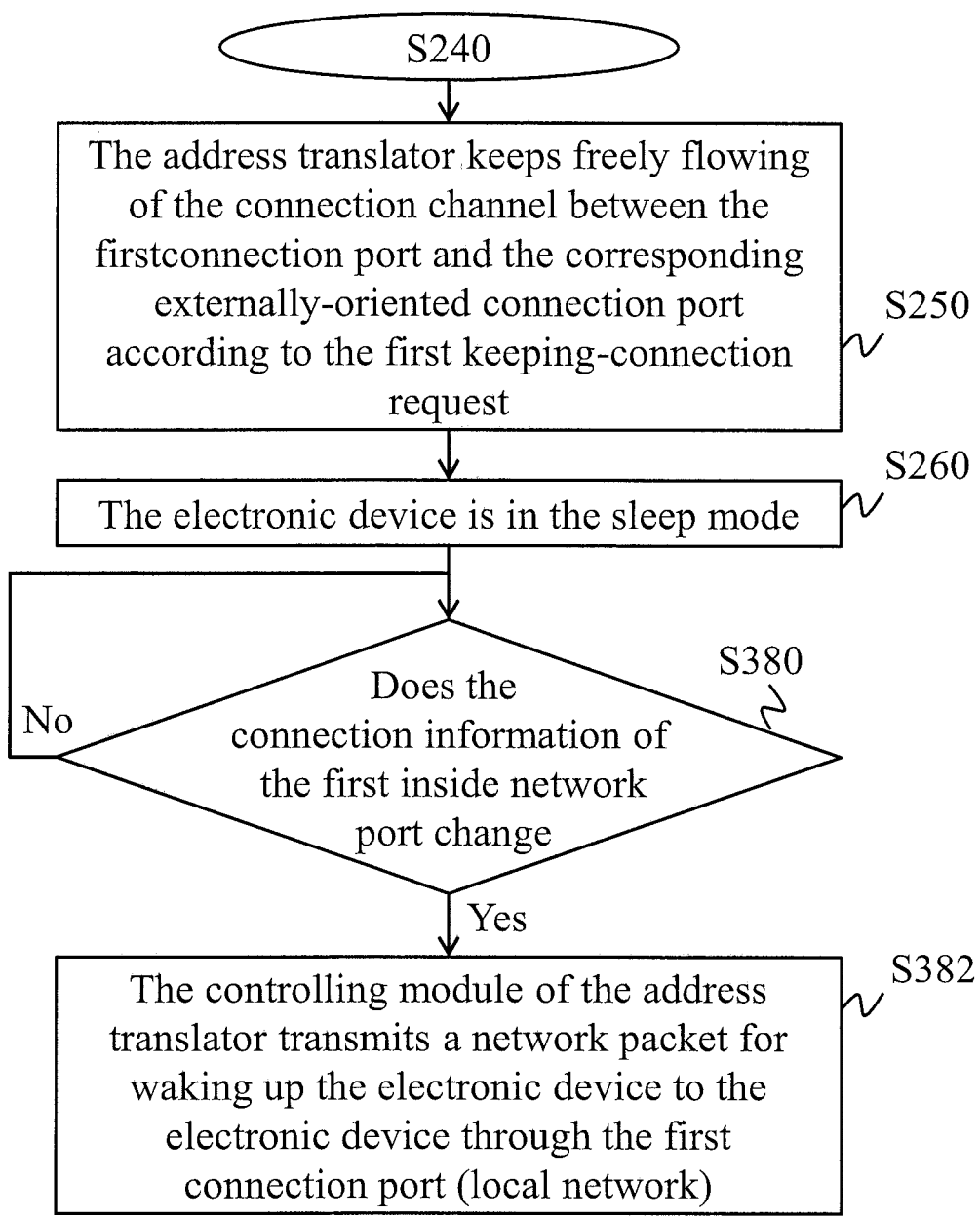
FIG. 7 is a partial flow chart illustrating a third embodiment of the communication method according to the instant disclosure.

In some embodiments, the connection information of first connection port 131-1 is floating. Please referring to FIG. 7, after the controlling module 137 keeps the first connection port 131-1 to continuously be valid/alive (step S250), the controlling module 137 detects whether the connection information of the first connection port 131-1 is changed or not (step S380). When the connection information of the first connection port 131-1 is changed, the controlling module 137 sends a network packet for waking up the electronic device 110 via the first connection port 131-1 (and the local network LN) (step S382). After the electronic device 110 is waked up, the electronic device 110 can re-send the keeping-connection request (namely, re-send the first keeping-connection request, or re-send the first and second keeping-connection requests) to the address translator 130 and the server 150. The second keeping-connection request sent from the address translator 130 to the server 150 further includes the second connection information (namely, current connection information) of the first connection port 131-1. After the server 150 receives the second keeping-connection request, the controlling module 157 updates the first connection information stored in the storing unit 159 with the second connection information of the second keeping-connection request and reserves the updated first connection information according to the second time of the second keeping-connection request. Therefore, during the second time, the first connection information in the storing unit 159 does not be eliminated due to that the electronic device 110 is in the sleep mode.

Figure 8:
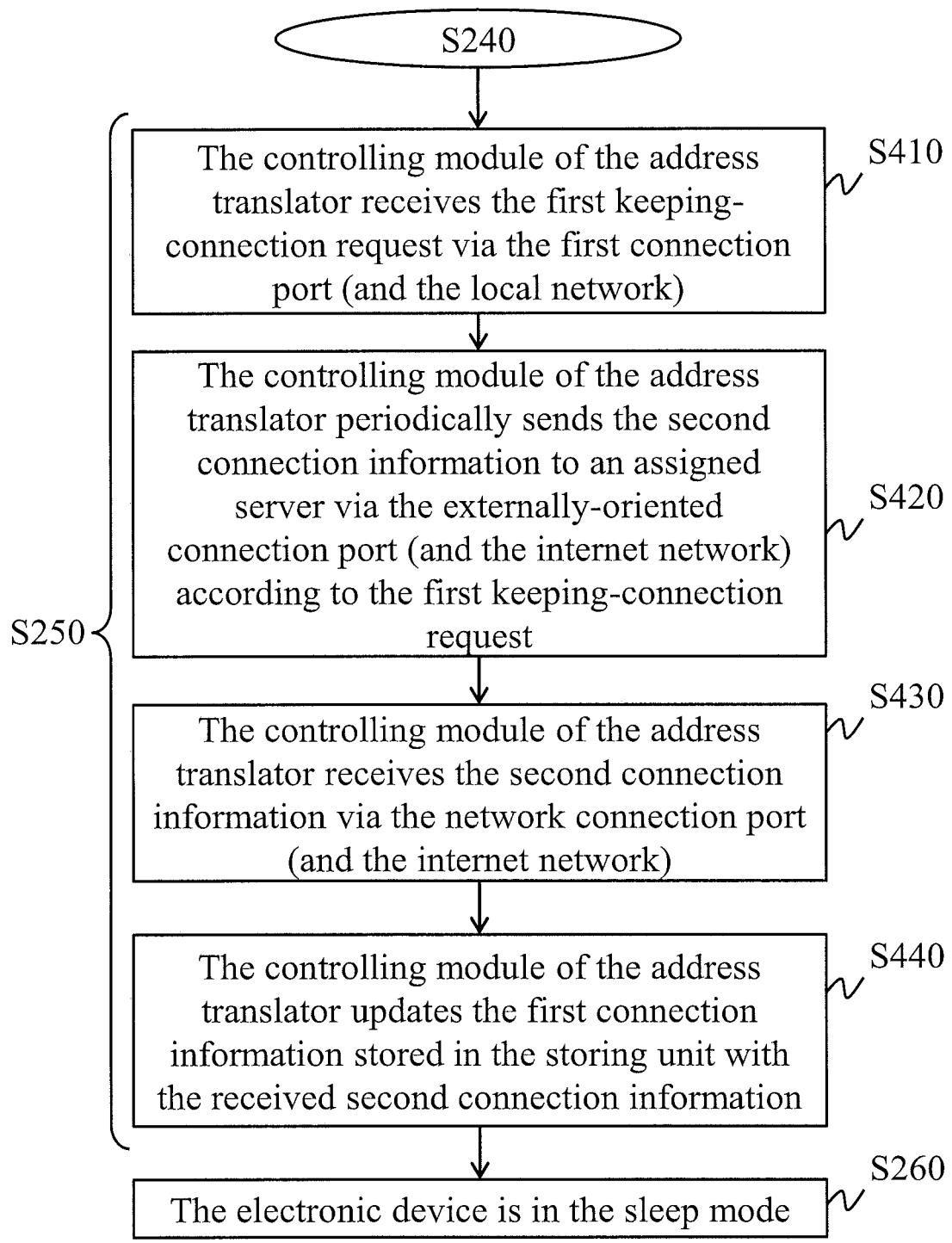
FIG. 8 is a partial flow chart illustrating yet another embodiment of step S250.

In some embodiments, please referring to FIG. 8, the first keeping-connection request adopted by the address translator 130 includes a sending time interval representing a time interval for requesting the address translator 130 to act for the electronic device 110 to send the network packet. Herein, the sending time interval can be defined by the electronic device 110 based on the preset time parameter and/or the historical sleep time and/or other information. In some embodiments, the first keeping-connection request can use the simple self-defined protocol between the electronic device 110 and the address translator 130 so that the electronic device 110 does not implement too many codes. In other embodiments, the electronic device 110 can be embedded the standard protocol, such as the universal plug and play, to implement the first keeping-connection request.

In the step S240, the electronic device 110 sends the first keeping-connection request having the sending time interval to the address translator 130 via the local network LN.

After the controlling module 137 of the address translator 130 receives the first keeping-connection request via the first connection port 131-1 (and the local network LN) (step S410), the controlling module 137 of the address translator 130 periodically sends the network packet to the assigned server 150 via the externally-oriented connection port 135 (and the internet network IN) according to the first keeping-connection request (step S420). In the step S420, the controlling module 137 sends, per the sending time interval, the network packet to the server 150 via the externally-oriented connection port 135 (and the internet network IN) according to the first keeping-connection request. The network packet includes the second connection information of the first connection port 131-1 of the address translator 130 connected to the electronic device 110.

In some embodiments, if the electronic device 110 sends the network packet in an encryption manner with a fixed key, the address translator 130 (the controlling module 137) just periodically sends the network packet to the server 150 in accordance with the network packet received at the first time from the electronic device 110 during the period of the agency. Thus, the address translator 130 can avoid the cost of embedding library and is easily developed.

In some embodiments, if the electronic device 110 supports an encryption manner with a random key, the electronic device 110 first communicates with the address translator 130 to confirm whether the address translator 130 (the controlling module 137) supports the encryption function with the random key. If the address translator 130 supports the encryption function with the random key, the address translator 130 (the controlling module 137) can periodically send the network packet to the server 150 in the encryption manner with the random key during the period of the agency. If the address translator 130 does not support the encryption function with the random key, the electronic device 110 is first switched into in the encryption manner with the fixed key and then communicates with the server 150 in the encryption method with the fixed key. During the period of the agency, the address translator 130 (the controlling module 137) can successfully act for the electronic device 110 to periodically send the network packet to the server 150.

In some embodiments, there are two ways making the address translator 130 (the controlling module 137) to support the encryption manner with the random key. The first way is directly embedding the function of library of the electronic device 110 to the address translator 130. The second way is that the electronic device 110 informs the address translator 130 the encryption manner with the random key and a random key table so that the address translator 130 (the controlling module 137) can act for the electronic device 110 to periodically send the network packet to the server 150 in the encryption manner with the random key according to the encryption manner with the random key and the random key table informed from the electronic device 110.

The controlling module 157 of the server 150 receives the network packet comprising the second connection information via the network connection port 151 (and the internet network IN) (Step S430) and updates the first connection information in the storing unit 159 with the received second connection information (Step S440). In other words, the address translator 130 (the controlling module 137) acts for the electronic device 110 to actively and periodically send the network packet to the controlling module 157 of the server 150 per at the sending time interval during the period of the agency. Since the network packet is periodically sent from the internet network IN to the server 150, the freely flowing of the internet network IN is reserved and the record the connection information of the first connection port 131-1 of the address translator 130 corresponding to the electronic device 110 stored in the server 150 is kept to be updated. Thus, even the electronic device 110 is in the sleep mode without any network activity, the remote device 170 can find out the connection information of the first connection port 131-1 of the address translator 130 connected to the electronic device 110 from the server 150 anytime.

In some embodiments, the network communication system 10 further includes a remote device 170, and the remote device 170 is connected to and communicates with the server 150 via the internet network IN.

Figure 9:
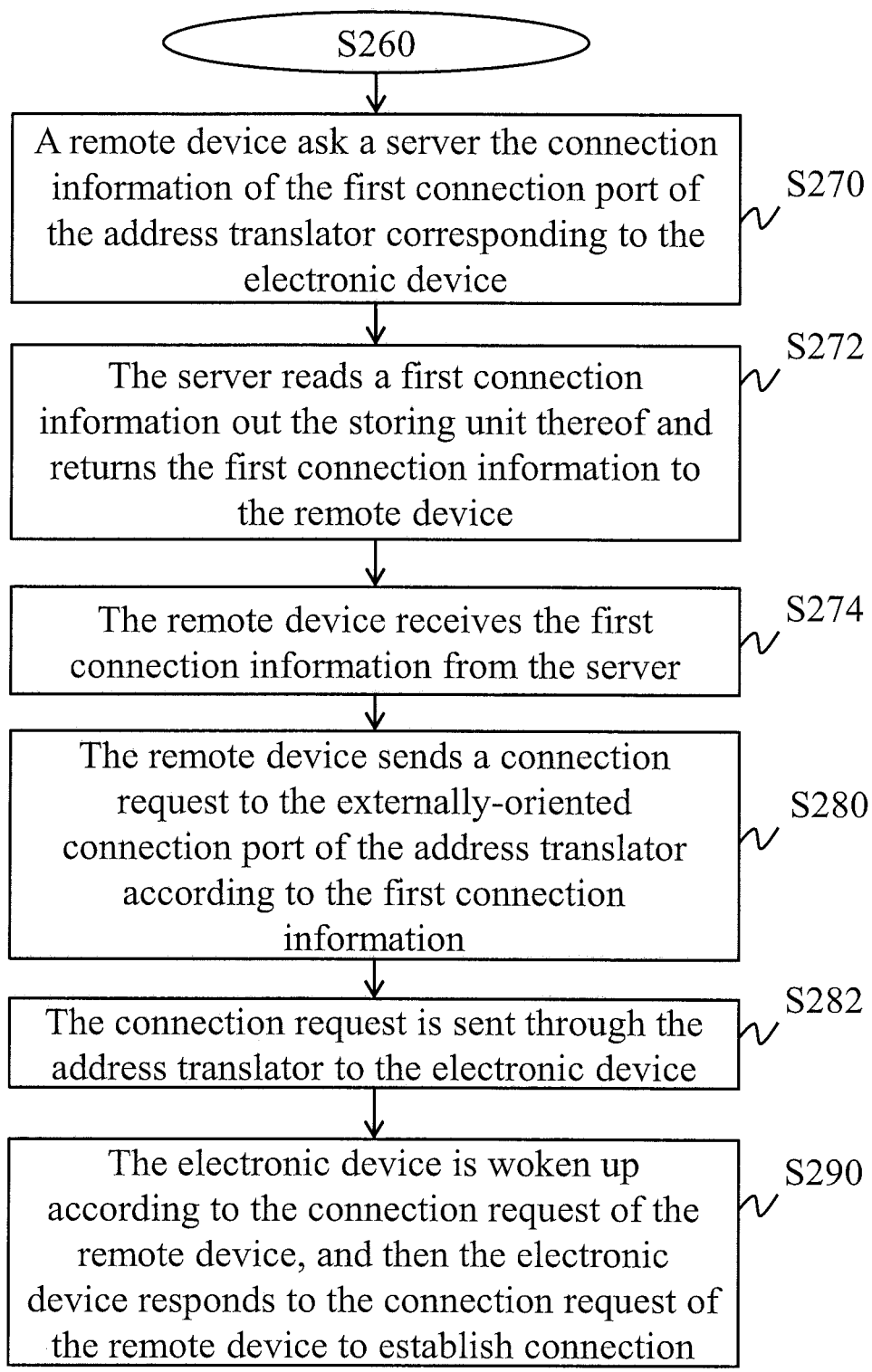
FIG. 9 is a partial flow chart illustrating a forth embodiment of the communication method according to the instant disclosure.

Please referring to FIGS. 1 and 9, when the remote device 170 wants to be connected to the electronic device 110, the remote device 170 first sends an asking request to the server 150 to ask the connection information of the network connection port (the first connection port 131-1) of the address translator 130 corresponding to the electronic device 110 (step S270). The server 150 (the controlling module 157) reads the first connection information out the storing unit 159 thereof according to the asking request from the remote device 170 and returns the read first connection information to the remote device 170 (step S272). After the remote device 170 receives the first connection information from the server 150 (step S274), the remote device 170 can execute a connection procedure according to the received first connection information. During the connection procedure, the remote device 170 sends a connection request to the externally-oriented connection port 135 of the address translator 130 according to the first connection information (step S280). Since the connection channel between the first connection port 131-1 and the externally-oriented connection port 135 is kept to be the freely flowing, the connection request is successfully sent from the remote device 170 via the address translator 130 to the electronic device 110 (step S282).

When the electronic device 110 receives the connection request (which transmitted in a network packet) from the remote device 170, the electronic device 110 is waked up according to the connection request of the remote device 170, and then the electronic device 110 responds to the connection request of the remote device 170 to establish the connection between the electronic device 110 and the remote device 170 (step S290).

In some embodiments, when the address translator 130 (the controlling module 137) receives the connection request from the remote device 170 via the externally-oriented connection port 135, the address translator 130 (the controlling module 137) can send the network packet for waking up the electronic device 110 to the electronic device 110 via the first connection port 131-1 (and the local network LN). After the electronic device 110 is waked up, the address translator 130 (the controlling module 137) sends the connection request from the remote device 170 to the electronic device 110 via the first connection port 131-1 (and the local network LN).

In some embodiments, the electronic device 110 can record the previous sleeping status and previous waked status, the electronic device 110 estimates whether the first time originally requested conforms to the preferable performance or not to be a basis for adjusting the duration of the first time before the electronic device 110 re-sends the keeping-connection request (namely, re-sends the first keeping-connection request, or re-sends the first and second keeping-connection requests). For example, when the electronic device 110 is waked up because the requested first time is up, the electronic device 110 can increase the next requested first time. Then, before the electronic device 110 gets into the sleep mode again, the electronic device 110 sends the increased first time (the first keeping-connection request) to the address translator 130. Otherwise, when the electronic device 110 is waked up because the remote device 170 is connected thereto or the connection information (being floating) of first connection port 131-1 is changed, the electronic device 110 can decrease the next requested first time. Then, before the electronic device 110 gets into the sleep mode again, the electronic device 110 sends the decreased first time (the first keeping-connection request) to the address translator 130. The way of decreasing the next requested first time may be reducing the original requested first time by one step (such as, a preset time interval), or requesting the previous remnant (namely, the time is deducting the previous reserving time from the original requested first time). The previous reserving time means the time interval from the time of the electronic device 110 gets into the sleep mode to the time of the electronic device 110 is waked up. For example, if the original requested first time is three days and the electronic device 110 is waked up after two days, the electronic device 110 just requests the first time of one day when the electronic device 110 gets into the sleep mode again.

It should be noted that although the foregoing embodiments describe the steps sequentially; however, the sequence of the steps is not intended to limit the scope the present invention, those skilled in the relevant art should be able to understand the sequence of part of the steps can be simultaneously executed or successively reversed under reasonable circumstances.

In some embodiments, in the network communication system 10, each element can implement the above-mentioned steps by using the controlling module executing the firmware or software stored in the storing unit. In other words, the storing unit is used to store the software or firmware program, information, data, and combinations thereof.

The electronic device 110 and the remote device 170 can be any electronic device with the capable of connecting to the network. The remote device 170 represents the device actively sending the connection request, such as, a personal computer (PC), a smart phone, a portable navigation device (PND), a tablet, a pad, a smart appliance or the like. The electronic device 110 represents the device passively receiving the connection request, such as, a video camera, an IP cam, a smart appliance or the like. The address translator 130 can be a network address translation (NAT), a router, or an exchanger. The server 150 can be point-to-point (P2P) server. Each connection information includes the address data of the first connection port 131-1, such as, internet protocol address (IP address) and port address.

Each controlling module can be implemented by one or more processing elements. The processing element can be a microprocessor, a microcontroller, a digital signal processor (DSP), a microcomputer, a central processing unit (CPU), a field programming gate array, a programmable logic device, a state machine, a logic circuit, an analog circuit, a digital circuit, and/or any device processing analog and/or digital signal based on the operation instruction. Each storing unit can be implemented by one or more storing elements. The storing element can be a read-only memory (ROM), a random access memory (RAM), a non-volatile memory, a volatile memory, a static memory, a dynamic memory, a flash memory and/or any device storing digital information.

In summary, the communication method for keeping network connection of an electronic device in a sleep mode, address translator, and server using the same according to the embodiments can make the electronic device getting into low power consumption state (i.e. the sleep mode) and keep freely flowing of the network connection for the network connection port (i.e. the first connection port) of the address translator corresponding to the electronic device. In some embodiments, the address translator can slightly modify codes implementing any embodiment of the present disclosure without implanting the third-party library, and therefore the development cost of the communication system is decreased. Meanwhile, the electronic device can slightly increase the codes conforming to a simple protocol. Accordingly, in comparison with the technique with implanting the third-party library, the communication method for keeping network connection of an electronic device in a sleep mode, address translator, and server using the same according to the embodiments can significantly reduce the use of memory.

While the instant disclosure has been described by way of examples and in terms of the embodiments, it is to be understood that the invention needs not to be limited to the disclosed embodiments. For anyone skilled in the art, various modifications and improvements within the spirit of the instant disclosure are covered under the scope of the instant disclosure. The covered scope of the instant disclosure is based on the appended claims.

What is claimed is:

1. A communication method for keeping network connection of an electronic device in a sleep mode, comprising:

connecting an address translator to the electronic device via a local network; connecting the address translator to a server via an internet network; providing a connection channel between the electronic device and the server by using the address translator;

sending a first keeping-connection request from the electronic device to the address translator before the electronic device gets into a sleep mode, wherein the first keeping-connection request comprises a first time, the first time is defined by the electronic device according to previous sleeping status and previous waked status of the electronic device, and the electronic device increase or decrease a duration of a previous first time according to the previous sleeping status and the previous waked status to generate the first time;

keeping freely flowing of the connection channel according to the first keeping-connection request and starting to time an elapsed time by using the address translator when the electronic device is in the sleep mode, wherein the step of keeping freely flowing of the connection channel according to the first keeping-connection request by using the address translator when the electronic device is in the sleep mode comprises:

reserving a first connection port of the address translator connected to the electronic device for the first time by using the address translator;

waking up the electronic device in the sleep mode when the elapsed time reaches the first time:

waking up the electronic device in the sleep mode when a connection information of the first connection port is changed: and waking up the electronic device in the sleep mode when receiving a connection request for requesting to connect the electronic device generating a first acknowledgement packet according to the first keeping-connection request by using the address translator;

returning the first acknowledgement packet to the electronic device from the address translator;

sending a second keeping-connection request to the server via the internet network by using the address translator;

generating a second acknowledgement packet according to the second keeping-connection request by using the server; and returning the second acknowledgement packet to the electronic device from the server via the address translator;

wherein the electronic device gets into the sleep mode according to the first acknowledgement packet and the second acknowledgement packet.

2. The communication method for keeping network connection of an electronic device in asleep mode of claim 1, further comprising:
generating and returning an acknowledgement packet to the electronic device according to the first keeping-connection request by using the address translator, wherein the electronic device gets into the sleep mode according to the acknowledgement packet.

3. The communication method for keeping network connection of an electronic device in a sleep mode of claim 1, wherein the step of keeping freely flowing of the connection channel according to the first keeping-connection request by using the address translator when the electronic device is in the sleep mode comprises:
periodically sending a connection information of the address translator connected to the electronic device according to the first keeping-connection request when the electronic device is in the sleep mode by using the address translator, to keep the freely flowing of the connection channel.

4. The communication method for keeping network connection of an electronic device in a sleep mode of claim 1, further comprising:
sending a second keeping-connection request to the server via the internet network by using the address translator; and
reserving the connection information stored in the server according to the second keeping-connection request by using the server to not eliminate the connection information because the electronic device is in the sleep mode.

5. The communication method for keeping network connection of an electronic device in a sleep mode of claim 1, wherein the step of keeping freely flowing of the connection channel according to the first keeping-connection request by using the address translator when the electronic device is in the sleep mode further comprises:
when an elapsed time for reserving the first connection port reaches the first time, sending a network packet for waking up the electronic device to the electronic device by using the address translator.

6. The communication method for keeping network connection of an electronic device in a sleep mode of claim 1, further comprising:
sending a second keeping-connection request to the server via the internet network by using the address translator, wherein the second keeping-connection request comprises a second time and the second time is large than the first time; and
reserving the connection information stored in the server according to the second time by using the server, wherein during the second time, the server does not eliminate the connection information because the electronic device is in the sleep mode.

7. The communication method for keeping network connection of an electronic device in a sleep mode of claim 1, further comprising:
when the electronic device is in the sleep mode and a connection information of the address translator connected to the electronic device is changed, sending a network packet for waking up the electronic device to the electronic device by using the address translator.

8. An address translator, comprising:
a plurality of internal-oriented connection ports, a first connection port of the internal-oriented connection ports is connected to an electronic device via a local network;
an externally-oriented connection port, connected to a server via an internet network; and
a controlling module, connected to the internal-oriented connection ports and the externally-oriented connection port and forming a connection channel between the first connection port and the externally-oriented connection port;
wherein the controlling module receives a first keeping-connection request from the electronic device^ end-keeps freely flowing of the connection channel between the first connection port and the externally-oriented connection port according to the first keeping-connection request when the electronic device is in the sleep mode, and starting to time an elapsed time;
wherein the controlling module further wakes up the electronic device in the sleep
mode when the elapsed time reaches the first time, a connection information of the first
connection port is changed or receiving a connection request for requesting to connect the
electronic device; and
wherein the first keeping-connection request comprises a first time, the first time is defined by the electronic device according to previous sleeping status and previous waked status of the electronic device, and the electronic device increases or decreases a duration of a previous first time according to the previous sleeping status and the previous waked status to generate the first, time, and the controlling module reserves the first connection port for the first time to keep the freely flowing of the connection channel;
generating a first acknowledgement packet according to the first keeping-connection request by using the address translator;
returning the first acknowledgement packet to the electronic device from the address translator;
sending a second keeping-connection request to the server via the internet network by using the address translator;
generating a second acknowledgement packet according to the second keeping-connection request by using the server; and
returning the second acknowledgment packet to the electronic device from the server via the address translator;
wherein the electronic device gets into the sleep mode according to the first acknowledgement packet and the second acknowledgement packet.

9. The address translator of claim 1, wherein the controlling module further receives a second keeping-connection request from the electronic device and sends the second keeping-connection request to the server via the externally-oriented connection port.

10. The address translator of claim 8, wherein the controlling module further
generates a second keeping-connection request according to the first keeping-connection request and sends the second keeping-connection request to the server via the externally-oriented connection port.

11. The address translator of claim 8, wherein when an elapsed time for reserving the first connection port reaches the first time, the controlling module further sends a network packet for waking up the electronic device to the electronic device via the first connection port.

12. The address translator of claim 8, wherein the controlling module further sends a second keeping-connection request to the server via the externally-oriented connection port, the second keeping-connection request comprises a second time larger than the first time, and during the second time, the server does not eliminate a connection information of the first connection port according to the second keeping-connection request.

13. The address translator of claim 8, wherein when a connection information of the first connection port is changed, the controlling module further sends a network packet for waking up the electronic device to the electronic device via the first connection port.

14. The address translator of claim 8, wherein the controlling module periodically sends a connection information of the first connection port to the server via the externally-oriented connection port according to the first keeping-connection request, to keep the freely flowing of the connection channel.

15. The address translator of claim 14, wherein the first keeping-connection request comprises a sending time interval, and the controlling module periodically sends a current connection information at the sending time interval.

16. The address translator of claim 14, wherein the externally-oriented connection port is further connected to a remote device via the internet network; wherein the controlling module further receives a connection request from the remote device via the internet network, and sends a network packet for waking up the electronic device to the electronic device according to the connection request; and wherein the controlling module further establishes the connection between the remote device and the electronic device after the electronic device is waked up.

17. A server, comprising:
a network connection port, receiving a keeping-connection request from an address translator via an internet network wherein the keeping-connection request comprises a second time;
a storing unit, storing a connection information of the address translator; and
a controlling module, connected to the network connection port and the storing unit, reserving the connection information stored in the storing unit according to the keeping-connection request to not eliminate the connection information stored in the storing unit during the second time when an electronic device which connected to the address translator is in the sleep mode, wherein the second time is larger than the preset time, the second time is defined by the electronic device according to the previous sleeping status and previous waked status of the electronic device, and the electronic device increases or decreases a duration of a previous second time according to the previous sleeping status and the previous waked status to generate the second time;
waking up the electronic device in the sleep mode when the elapsed time reaches the first time;
waking up the electronic device in the sleep mode when a connection information of the first connection port is changed; and
waking up the electronic device in the sleep mode when receiving a connection request for requesting to connect the electronic device;
generating a first acknowledgement packet according to the first keeping-connection request by using the address translator;
returning the first acknowledgement packet to the electronic device from the address translator;
sending a second keeping-connection request to the server via the internet network by using the address translator;
generating a second acknowledgement packet according to the second keeping-connection request by using the server; and
returning the second acknowledgement packet to the electronic device from the server via the address translator;
wherein the electronic device gets into the sleep mode according to the first acknowledgement packet and the second acknowledgement packet.

18. The server of claim 17, wherein the controlling module detects an elapsed time when the network connection port does not receive a network packet from the address translator; and wherein the controlling module reserves the connection information stored in the storing unit according to the keeping-connection request when the elapsed time reaches a preset time and the network connection port receives the network packet.

19. The server of claim 17, wherein the controlling module receives a current connection information from the address translator via the network connection port and updates the connection information stored in the storing unit by using the current connection information.

20. The communication method for keeping network connection of an electronic device in a sleep mode of claim 1,
wherein the electronic device estimates whether the first time originally requested conforms to the preferable performance or not to be a basis for adjusting the duration of the first time according to the previous sleeping status and the previous waked status of the electronic device before the electronic device sends the keeping-connection request, and wherein when the electronic device is in the sleep mode, the electronic device does not have any network activity.

21. The address translator of claim 8,
wherein the electronic device estimates whether the first time originally requested conforms to the preferable performance or not to be a basis for adjusting the duration of the first time according to the previous sleeping status and the previous waked status of the electronic device before the electronic device sends the keeping-connection request, and wherein when the electronic device is in the sleep mode, the electronic device does not have any network activity.

22. The server of claim 17, wherein the electronic device estimates whether the second time originally requested conforms to the preferable performance or not to be a basis for adjusting the duration of the second time according to the previous sleeping status and the previous waked status of the electronic device before the electronic device sends the keeping-connection request.

* * * * *